United States Patent
Hurwitz et al.

[11] Patent Number: 6,067,113
[45] Date of Patent: May 23, 2000

[54] OFFSET NOISE CANCELLATION IN ARRAY IMAGE SENSORS

[75] Inventors: Jonathan Ephriam David Hurwitz; Peter Brian Denyer, both of Edinburgh, United Kingdom

[73] Assignee: VSLI Vision Limited, Scotland, United Kingdom

[21] Appl. No.: 08/749,056

[22] Filed: Nov. 14, 1996

[30] Foreign Application Priority Data

Sep. 12, 1996 [GB] United Kingdom .................. 9619088

[51] Int. Cl.[7] .............................. H04N 5/217; H04N 9/64; H04N 3/14
[52] U.S. Cl. ........................... 348/241; 348/250; 348/301
[58] Field of Search ................................... 348/301, 241, 348/302, 308, 304, 250, 252, 246; 327/52, 56, 77; 250/208.1; 358/463, 482, 483

[56] References Cited

U.S. PATENT DOCUMENTS

| | | |
|---|---|---|
| 4,942,474 | 7/1990 | Akimoto et al. . |
| 4,987,321 | 1/1991 | Toohey .................................... 348/241 |
| 5,187,583 | 2/1993 | Hamasaki ............................... 348/250 |
| 5,296,696 | 3/1994 | Uno ........................................ 348/246 |
| 5,434,619 | 7/1995 | Yonemoto .............................. 348/241 |
| 5,471,515 | 11/1995 | Fossum et al. . |
| 5,488,415 | 1/1996 | Uno ........................................ 348/241 |
| 5,698,844 | 12/1997 | Shinohara et al. .................... 250/208.1 |
| 5,708,471 | 1/1998 | Okumura ............................... 348/308 |
| 5,717,458 | 2/1998 | Yonemoto .............................. 348/301 |

FOREIGN PATENT DOCUMENTS 0 617 552  9/1994  European Pat. Off. .

OTHER PUBLICATIONS

Garverick et al., A 32–Channel Charge readout IC for Programmable, Nonlinear Quantization of Multichannel Detector Data, IEEE Journal of Solid–State circuits, vol. 30, No. 5, May 1995, pp. 533–541.

*Primary Examiner*—Wendy Garber
*Assistant Examiner*—Luong Nguyen
*Attorney, Agent, or Firm*—Alston & Bird LLP

[57] ABSTRACT

An integrated circuit active pixel image sensor comprises an array of active pixels having associated therewith one capacitor in each pixel column for storing a combined pixel output signal comprising an image signal and a fixed offset signal and another capacitor in each column for capturing another signal produced when the pixel is reset. The array may be read row-by-row. Each column includes a comparator and a data latch via which a digitized fixed offset corrected pixel output signal is obtained using a ramp voltage source and a digital count broadcaster provided in the sensor.

5 Claims, 4 Drawing Sheets

6,067,113

OFFSET NOISE CANCELLATION IN ARRAY IMAGE SENSORS

BACKGROUND OF THE INVENTION

This invention relates to the cancellation of fixed pattern noise in active pixel sensors arrays and, in particular, to a method and apparatus for cancelling voltage offset noise in active pixel image sensor arrays.

Active pixel sensor (APS) arrays are solid state image sensing structures, typically manufactured using CMOS technology. They are distinguished by integrating some form of active electronic circuitry within each pixel to produce a buffered or amplified representation of the small signal charge induced by photoelectric conversion in the pixel. Typically the pixel output takes the form of a low-impedance voltage signal.

Whilst the low impedance pixel output is useful in the pixel reading operation, each buffer or amplifier commonly exhibits a fixed voltage offset which varies randomly with pixel location. If these offsets are left uncorrected, the resulting images produced from the pixel outputs are marred by a fixed speckled pattern.

This has been recognised by others working in this field, and techniques have been developed to cancel these offsets.

One example of such a technique is described in U.S. Pat. No. 4,942,474 (Akimoto et al.), who teach the use of two capacitors in each column of pixels in the pixel array. A row of pixels is first read into one row of capacitors, which then each hold one sample of a pixel output with combined signal and offset. The same row of pixels is then reset and the pixel outputs during reset are stored in the second row of capacitors. As the reset output from the pixels also contains the same offset, then the difference between the values stored on the two capacitors in each column represents solely the signal value that is to be detected. This differencing may occur in many ways all of which involve reading or "scanning out" from the pixel array the stored values from the pair of capacitors in each column and differencing each pair of scanned out values.

SUMMARY OF THE INVENTION

According to one broad aspect of the present invention, an integrated circuit active pixel image sensor comprises: an array of active pixels arranged in rows and columns; signal storage means associated with said active pixels for storing one of: a fixed offset signal, and a combined pixel output signal comprising an image signal and a fixed offset signal; pixel output signal capture means for capturing the other one of said fixed offset signal, and said combined fixed output signal; and fixed-offset-correction means provided in said image sensor and formed and arranged so as to apply said fixed offset signal to said combined pixel output signal so as to produce a fixed-offset-corrected pixel output signal which can be read directly from the image sensor.

According to a first, preferred, aspect of the present invention an integrated circuit active pixel image sensor comprises: an array of active pixels arranged in rows and columns; signal storage means associated with said active pixels for storing fixed offset output signals from said pixels; pixel output signal capture means for capturing combined pixel output signals each comprising an image signal and a fixed offset signal from a respective pixel; and fixed-offset-correction means provided in said image sensor and formed and arranged so as to apply the stored fixed-offset output signal from each pixel to said combined pixel output signals so as to produce fixed-offset-corrected pixel output signals which can be scanned out directly from the image sensor.

According to another preferred aspect of the present invention an integrated circuit active pixel image sensor comprises: an array of active pixels arranged in rows and columns; signal storage means associated with said active pixels for storing combined pixel output signals which each comprise an image signal and a fixed offset signal from a single pixel;and fixed-offset-correction means provided in said image sensor and formed and arranged so as to apply a respective offset signal correction to each said stored combined pixel output signal so as to produce respective fixed-offset-corrected pixel output signals which can be scanned out directly from the image sensor.

Preferably, in each column of the pixel array there is provided a said signal storage means for storing a said combined pixel output signal from any nominated one of the pixels in said column; and fixed-offset-correction means formed and arranged to apply a said fixed offset signal correction to a said combined pixel output signal stored in said storage means, so as to produce a said fixed-offset-corrected pixel output signal which can be scanned out directly from said column of the array.

Preferably said offset signal correction is derived from a pixel output signal from the respective active pixel in a reset condition thereof.

Said signal storage means preferably comprises capacitor means. Preferably, each column of the pixel array is provided with respective capacitor means. One or more capacitors may be provided in each said column. At least two capacitors arranged in series may be provided in each column.

The fixed-offset-correction means may be implemented in various different ways comprising one or more components selected from: at least one switch means, at least one capacitor, electronic buffer means, comparator means, latch means, one or more constant reference voltage sources, and one or more ramp voltage sources. Each column of the pixel array may be provided with respective fixed-offset-correction means.

According to another aspect of the invention, an integrated circuit active pixel image sensor comprises an array of active pixels arranged in rows and columns, and pixel read and reset means for reading and resetting said pixels row by row, wherein each of said pixel columns is provided with: first capacitor means selectively connectable to each pixel in said column for storing a combined signal comprising an image signal and a fixed offset signal, from a nominated pixel in said column and a nominated one of said rows; second capacitor means in series with said first capacitor means; a reference voltage input means via which a constant reference voltage may be applied to said second capacitor means so as to hold said second capacitor means at a constant reference voltage while said combined pixel output signal is stored on said first capacitor means; and first switch means for isolating said second capacitor means from said reference voltage input means while said pixel is reset, whereby said first and second capacitor means are coupled so as to enable said first capacitor means to at least partially discharge through said second capacitor means; and second switch means for isolating said second capacitor means from said first capacitor means so as to allow a fixed-offset-corrected signal present on said second capacitor means to be read out; and said image sensor further comprises signal read out means connectable to each of said pixel columns for reading out said fixed-offset-corrected signal from each of said second capacitor means. It will be appreciated that in practice the first capacitor means may be physically connected all the time to all the pixels in each column but is only selectively connected to a pixel output signal producing portion thereof when "reading" or addressing a particular pixel.

The signal read out means may, for example, comprise an output bus and at least one charge detecting transducer. Each column of said pixel array may also be provided with a voltage buffer connected between said first capacitor means and said column of pixels. Alternatively, and preferably, each said column is provided with a voltage buffer connected between said first and second capacitor means. In the latter case, advantageously third capacitor means is also provided, in series with said first capacitor means, and in parallel with said second capacitor means, for storing a buffer offset signal.

According to a third aspect of the invention, an integrated circuit active pixel image sensor comprises an array of active pixels arranged in rows and columns, and pixel read and reset means for reading and resetting said pixels row by row, wherein each of said pixel columns is provided with: first capacitor means selectively connectable to each pixel in said column for storing a combined pixel output comprising an image signal and a fixed offset signal, from a nominated pixel in said column and a nominated one of said rows; second capacitor means in series with said first capacitor means and also selectively connectable to each pixel in said column, for storing a further signal obtained when said first and second capacitor means are both connected to said nominated pixel and said nominated pixel is reset; voltage reference input means via which a constant reference voltage may be applied to one terminal of said first capacitor means while said combined pixel output signal is stored on said first capacitor means; voltage reference input means via which a constant reference voltage may be applied to one terminal of said second capacitor means while said further signal is stored on said second capacitor means; and comparator means for comparing said signals stored on said first and second capacitor means so as to obtain a fixed-offset-corrected pixel output signal for said nominated pixel.

The first and second capacitor means are preferably each selectively connectable to said pixel by a respective switch means provided therefor.

The image sensor preferably includes at least one constant reference voltage source selectively connectable to said reference voltage input means of said pixel columns.

The image sensor may further comprise a ramp voltage source which is selectively connectable to one terminal of one of said first and second capacitor means and latch means connected to an output terminal of said comparator means for detecting a change in polarity in an output from said comparator means whereby said comparator means functions as a switch.

According to a yet further aspect of the invention, an integrated circuit active pixel image sensor comprises an array of active pixels arranged in rows and columns, and pixel read and reset means for reading and resetting said pixels row by row, wherein each of said pixel columns is provided with: capacitor means for storing a combined pixel output comprising an image signal and a fixed offset signal, from a nominated pixel in said column and a nominated one of said rows; comparator means having a negative input, a positive input and an output terminal, one terminal of said capacitor means being connected to said nominated pixel and the other terminal of said capacitor means being connected to said negative input of said comparator means; negative feedback means switchably connected between said first capacitor means and said negative input of the comparator means, for connection therebetween while said combined pixel output is stored on said capacitor means; and a voltage input means via which a constant reference voltage may be applied to the positive input of said comparator means while said combined pixel output signal is stored on said capacitor means, and via which a ramp voltage may be applied to said positive input of the comparator means while said pixel is reset so as to enable a fixed-offset-corrected signal discharged from said capacitor means to be detected by a matching ramp voltage signal value.

One or more constant reference voltage source(s) and, where necessary, ramp voltage means may preferably be provided in the integrated sensor. Alternatively, they may be provided externally of the image sensor.

Said ramp voltage means is preferably a monotonic voltage ramp.

A latch means is preferably connected to an output terminal of said comparator means for detecting a change in polarity in an output from said comparator means whereby said comparator means functions as a switch which switches when said ramp voltage signal value matches said fixed-offset-corrected signal discharged from said capacitor means.

Said image sensor according to said third and fourth aspects of the invention preferably further comprises digital count broadcasting means adapted to broadcast to each of said columns of the pixel array, simultaneously with said ramp voltage means, a digital count signal corresponding to a voltage produced by said ramp voltage means. The latch means is preferably adapted to latch said digital count signal at a switching point of said comparator output so as to obtain a digitised fixed-offset-corrected pixel output signal for said nominated pixel.

Said active pixels may be of photodiode type or, alternatively, of photogate type.

According to a still further aspect of the invention, a fixed-offset-cancellation method for an integrated circuit active pixel image sensor having an array of active pixels arranged in rows and columns, the method comprising the steps of:

(a) for each row of pixels, storing in said integrated circuit active pixel image sensor one of: a fixed offset signal read from a said pixel, and a combined pixel output signal read from each pixel in the row, said combined pixel output signals each comprising an image signal and a fixed offset signal read from a said pixel;

(b) capturing the other one of said fixed offset signal and said combined pixel output signal;

(c) applying a respective said fixed offset signal to each said combined pixel output signal, within said active pixel image sensor, so as to produce a fixed-offset-corrected pixel output signal; and (d) scanning out said fixed-offset-corrected pixel output signals directly from the image sensor.

Preferably the method includes the step of deriving said offset signal correction from a pixel output signal from the respective active pixel in a reset condition thereof.

Preferably, the combined pixel output signals are stored on first capacitor means provided in the active pixel image sensor. Where this is the case, step (b) may be achieved by the following sub-steps: providing second capacitor means in series with said first capacitor means; connecting said second capacitor means to a constant reference voltage source, so as to hold said second capacitor means at a constant reference voltage, while the combined pixel output signals are stored on said first capacitor means; isolating said second capacitor means from said constant reference voltage source so as to couple said first and second capacitor means together, thereby allowing said first capacitor means to at least partially discharge onto said second capacitor means; and resetting said pixels, whereby said fixed-offset-corrected pixel output signals are stored on said second capacitor means.

Advantageously, said fixed-offset-corrected pixel outputs are read directly from the image sensor in digitised form. Preferably, the fixed-offset-corrected pixel outputs are produced in analog form in said image sensor and are converted to digital form prior to being read out from said image sensor. Said conversion may be performed by serial analog to digital (A/D) conversion, preferably using latching means and voltage ramp means.

Preferably, said pixels are read row-by-row and, preferably, said fixed-offset-corrected pixel output signals are read out row-by-row, directly from said image sensor. The fixed-offset-corrected pixel output signals may be read out using an output bus.

Respective first and second capacitor means are preferably provided for each column of the array. Alternatively, first and second capacitor means could be provided for each pixel in the array.

According to a sixth aspect of the invention, a fixed-offset-cancellation method for an integrated circuit active pixel image sensor having an array of active pixels arranged in rows and columns, the method comprising the steps of: reading each row of pixels twice, once when the pixels contain a first signal comprising both an image signal to be detected and an offset signal, and once in a reset condition of the pixels when the pixels each contain a second signal comprising said offset signal; for each pixel in a said row, forming within a respective column of the array the difference between said first and second signals, and reading said difference at an output of said image sensor.

BRIEF DESCRIPTION OF THE DRAWINGS

Preferred embodiments of the invention will now be described, by way of example only, and with reference to the accompanying drawings in which.

DESCRIPTION OF THE PREFERRED EMBODIMENTS

Figure 1:
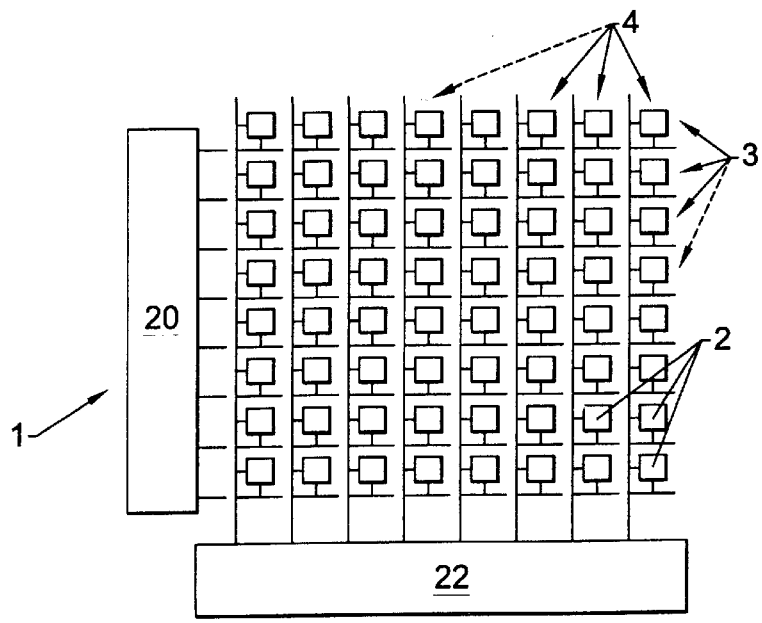
FIG. 1 is a schematic illustration of a known type of pixel array image sensor.

FIG. 1 shows schematically an integrated image sensor 1 comprising an array of active pixels 2 arranged in rows 3 and columns 4. The image sensor 1 is integrated on a chip. The pixels 2 are preferably fabricated in CMOS technology and incorporate photosensitive solid state devices such as photodiodes or photogate structures.

Figure 2:
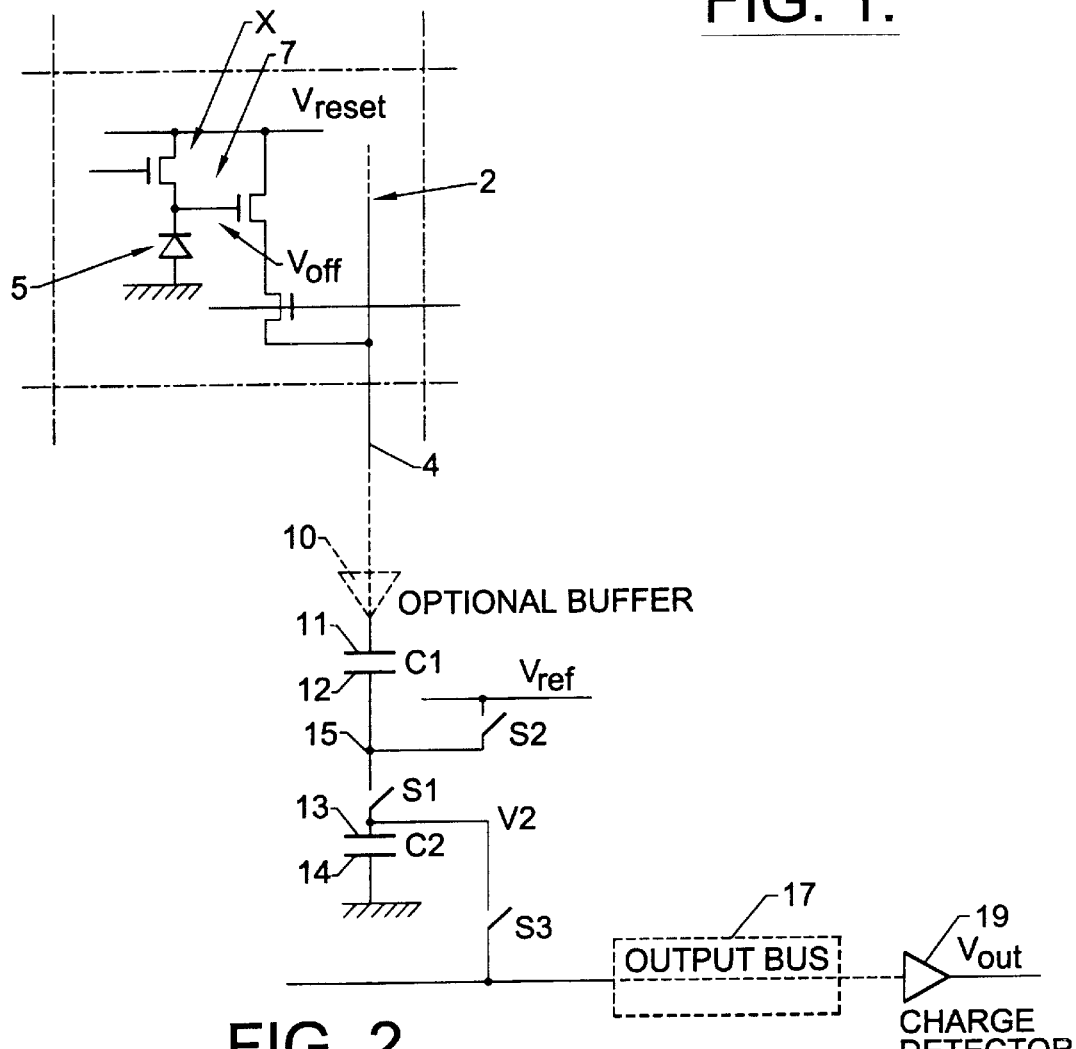
FIG. 2 shows schematically a portion of an active pixel image sensor according to a first embodiment of the invention.

FIG. 2 is an enlarged view of one active pixel 2 of the active pixel image sensor 1, according to a first embodiment of the present invention. The pixel 2 comprises a photodiode 5 and associated transistor circuitry 7 for amplifying or "buffering" the output from said photodiode (indicated in notational form). The pixel 2 is connected to a column 4 of the array. The column 4 comprises a signal line via which one pixel from each row of the array may be addressed and its output signal read or "scanned" out. A first capacitor C1 is provided in the column 4, so as to be in electronic connection with each pixel 2 in said column 4. An additional amplifier or "buffer" 10 may be connected between the first capacitor C1 (hereinafter referred to as "C1") and the pixels 2 in the column 4, although this is not essential. A second capacitor C2 (hereinafter referred to as "C2") is also provided in the column 4, in series with the first capacitor C1. A first terminal 11 of C1 is connected to the column 4 (via the buffer 10, where provided) and the second terminal 12 is connectable by a first switch S1 to a first terminal 13 of C2. The other, second terminal 14 of C2 is connected to electrical earth, as shown in FIG. 2.

A constant voltage reference Vref is provided by means of, for example, a buffered band-gap derived voltage reference and is connectable to the column 4 at a point 15, between the first and second capacitors C1, C2, by a second switch S2, so as to hold the first terminal 13 of C2 and the second terminal 12 of C1 at voltage Vref. The first switch S1 is located between the first terminal 13 of C2 and the connection 15 to the constant reference voltage Vref. The first terminal 13 of C2 is also connectable to an output bus 17 by a third switch S3, for reading a charge stored on C2 into an output charge detector 19 in the form of a charge transducer (preferably integrated on the same chip as the image sensor) which outputs the detected charge as a voltage output Vout.

An arrangement like that shown in FIG. 2 is provided in each column of the pixel array. The same reference voltage Vref is provided to all the columns 4 of the pixel array. In use, the pixel array is read row-by-row by means of sequential address means e.g. horizontal and vertical shift registers 20,22, indicated in block form in FIG. 1. For each pixel 2 in a nominated row 3 (nominated by the sequential address means) an arrangement as shown in FIG. 2 operates as follows. Switch S3 is open. An image signal (in the form a light signal) to be detected by the image sensor 1 is allowed to be incident upon the pixels 2 of the array. The image signal may be constantly incident upon the pixel array, or an optical shutter, for example, may be used for exposing the pixel array for a predetermined exposure period. While the image signal is incident on the array. The first switch S1 is closed, and the second switch S2 is closed so as to hold the first terminal 13 of C2 at voltage Vref. C2 is charged with the signal Vref. Node 50 of C1 charges to the combined output signal (Vreset−Vsig−Voff) from the active pixel, Vsig being the image signal to be detected, Vreset being a fixed pixel reset potential and Voff being a (fixed) voltage offset from the active electronic circuitry in the pixel 2. (Voff varies randomly from pixel to pixel in the array.)

Next, the second switch S2 is opened, thus removing the voltage clamp on C2, and the pixels in the chosen row are reset via MOS switch X. Now the pixel output 4 contains only the offset reset value, Vreset−Voff. As C2 is in series with C1, the potential on node 13 of C2 will change by:

$$V\text{sig}.(C1/(C1+C2))$$

Therefore, it can be shown that the total signal V2 stored on C2 is:

$$V2 = \text{Alpha} \cdot V\text{sig} + V\text{ref}$$

where Alpha is an attenuation factor, and Vref is common to all capacitors C2. By opening the first switch S1, V2 is stored on C2. V2 is subsequently read out from C2 by closing the third switch S3 to connect the first terminal 13 of C2 to the output bus 17. As the offset signal Voff has been cancelled in the total signal V2 on C2, a fixed-offset-corrected pixel output Vout=V2 for the pixel 2 can thus be read directly from C2. This is done for each pixel 2 in the nominated row of pixels. The fixed-offset-corrected pixel outputs Vout may be stored in an image frame store (not shown) provided externally of the image sensor 1. The process is then repeated for another row of pixels, and so on until a complete image can be compiled from the individual pixel outputs from all the pixels in the array.

Where a buffer 10 is provided between the pixel 2 and the first capacitor C1, as indicated in FIG. 2, any voltage offset produced by the buffer 10 is similarly cancelled by the arrangement of FIG. 2.

Figure 3:
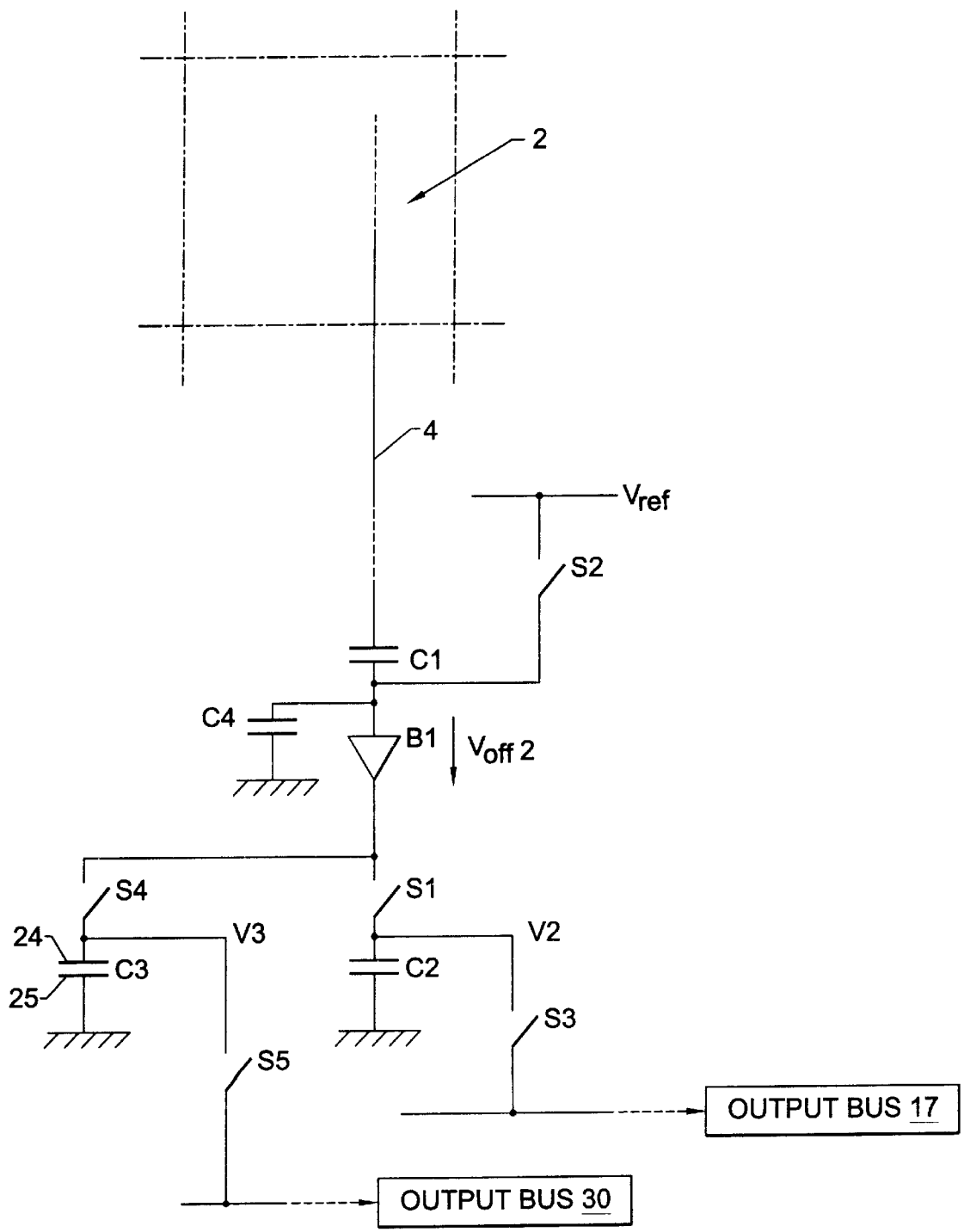
FIG. 3 shows schematically a portion of an active pixel image sensor according to a second embodiment of the invention.

FIG. 3 shows an improvement to the implemented offset cancellation arrangement shown in FIG. 2. Like parts to those shown in FIG. 2 are indicated by like reference numerals. In FIG. 3 a voltage buffer B1 is added to each column 4 of the array, between C1 and the first switch S1. The purpose of the buffer B1 is to significantly reduce the attenuation facto, Alpha, caused by the C1, C2 potential divider arrangement when the capacitors C1 and C2 are coupled together by opening the second switch S2. The buffer B1 has a small input parasitic capacitance C 4, as shown in FIG. 3. C4 is much smaller than C2. This has the effect of reducing the attenuation factor,Alpha, due to the dominance of C1 over the smaller buffer input parasitic capacitance C4. It can be shown that the attenuation factor becomes:

$$\text{Alpha } 2 = (C1/(C1+C4)) \cdot G\text{buff}$$

where Gbuff is the gain factor of the buffer (typically 0.9) and C4 is very small compared with C1. Thus, in this configuration, not only is the gain high, but it also becomes very well matched between columns, as small deviations in C1 or C4 have little effect under these circumstances, and the gain of buffers, such as the simple source follower type, is also known to be very well matched between adjacent devices on the same chip.

Unfortunately, adding the buffer B1 introduces a new offset, Voff2 which will deviate per column due to threshold voltage mismatches. This is countered by the provision of a third capacitor C3 (hereinafter referred to as "C3 "), in series with C1 and in parallel to C2, as shown in FIG. 3. A first terminal 24 of C3 is connectable, by a fourth switch S4, to the buffer B1 output and to the first terminal 13 of C2, above the first switch S1. The second terminal 25 of C3 is connected to electrical earth. By closing fourth switch S4, C3 stores the condition at the buffer B1 output when the first and second switches S1,S2 are closed. The signal V3 stored on C3 is thus:

$$V3 = (V\text{ref} - V\text{off } 2)$$

where Voff2 is the buffer B1 offset measured at an input voltage of Vref. Fourth switch S4 is then closed to store V3 on C3.

The signal V2 stored on C2 when the second switch S2 is subsequently opened can be shown to be:

$$\begin{aligned} V2 &= \text{Alpha2} \cdot V\text{sig} + V\text{ref} - V\text{off2} \\ &= V\text{sig} \cdot \text{Alpha} \cdot \text{Beta} + V\text{ref} - V\text{off2} \end{aligned}$$

where Beta is the gain (Gbuff) of the buffer B1 stage to signals measured with respect to Vref.

A second output bus 30 is connectable by a fifth switch S5 to the first terminal 24 of C3 to enable the stored signal V3 to be read out from C3. The potential difference between C2 and C3 is obtained, for example using a comparator(not shown) provided in the image sensor 1 to obtain a resultant offset-corrected pixel output, Vout, where:

$$V\text{out} = V2 - V3 = V\text{sig} \cdot \text{Alpha} \cdot \text{Beta}$$

As mentioned above, good matching of both Alpha and Beta attenuation factors may be expected from similar circuits provided on the same chip.

Figure 4:
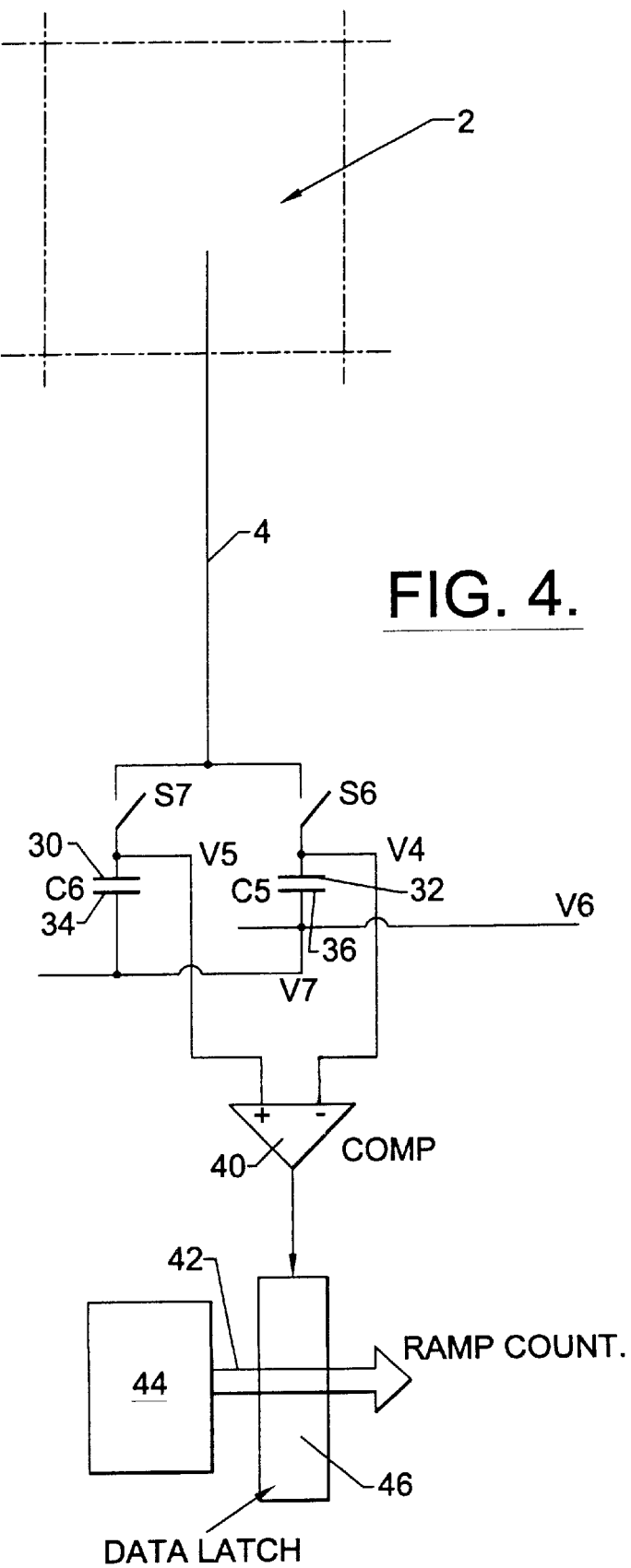
FIG. 4 shows schematically a portion of an active pixel image sensor according to a third embodiment of the invention.

FIG. 4 shows another embodiment of the invention applied to a digital sensor architecture. Again, like components to those shown in FIGS. 2 and 3 are referenced by like reference numerals. In the embodiment of FIG. 4, first and second capacitors C5, C6 are provided in each column of the pixel array, a first terminal 32,30 of each of C5 and C6 being switchably connectable by means of a respective switches S6, S7 to the pixels in the respective column for receiving signals from a pixel in a nominated row. A second terminal 36,34 of each of C5 and C6 is selectively connectable to a respective constant voltage source V6, V7. At least one ramp voltage source is also provided in the sensor 1 selectively connectable to a respective one of the second terminals 36,34 of C5 and C6. The first terminals 32,30 of C5 and C6 are also connected to respective inputs of a comparator 40 having one positive and one negative input, as shown in FIG. 4. A data latch 46 (indicated in block form only) is connected to the output of the comparator 40. The latch is configured to store the condition of data bus 42, when said output changes polarity. Data bus 42 communicates with a digital ramp generated in ramp counter 44. The condition of the data bus 42 is indicative of the digital ramp count. A separate data latch 46 is provided in each column of the array. Data bus 42 and ramp counter 44 are common to all columns.

In use, constant reference voltages V6 and V7 (which may be the same voltage or different voltages) are applied respectively to the second terminals 36,34 of the two capacitors C5, C6, switch S6 is closed and switch S7 is opened and the pixel array is exposed to an incoming image so that (once switch S6 is re-opened) a combined pixel output signal, comprising an image signal Vsig to be detected and an offset signal Voff−Vreset, stored in C5. Switch S7 is subsequently closed and the pixel 2 is reset. The signal stored on C5 is:

$$V\text{reset} - V\text{sig} - V\text{off}$$

while the resultant signal stored on C6 is:

$$V\text{reset} - V\text{off}$$

The potential difference between the two capacitors is thus equal to Vsig, the signal to be detected. Vsig is obtained using the following method.

The constant voltage reference V6 applied to terminal 36 of C5 is replaced by a monotonic analog voltage ramp Vr, commencing at value V6. The signal output from the comparator 40 will switch when the ramp voltage is sufficient to equalise the potential at the top plates of the capacitors i.e. when the first terminals 32,30 of the capacitors C5 and C6 are at equal potential. It can be shown that this will be the case when Vr=Vsig.

The ramp counter 44 generates and broadcasts a digital ramp count corresponding to the analog voltage ramp Vr, across all the pixel columns 4. The ramp counter 44 may be provided integrally in the sensor, or externally of the sensor. The latch 46 communicates with the ramp counter 44 via the output bus 42, and with the ramp voltage source, so that the value of the digital count is latched at the switching point of the comparator 40 the instant that the ramp voltage Vr=Vsig. The latched digital count provides a digital fixed-offset-corrected pixel output which may be read directly at an output (not shown) of the image sensor 1 and stored in an image frame store 46 provided in, for example, a camera in which the integrated image sensor is incorporated.

Figure 5:
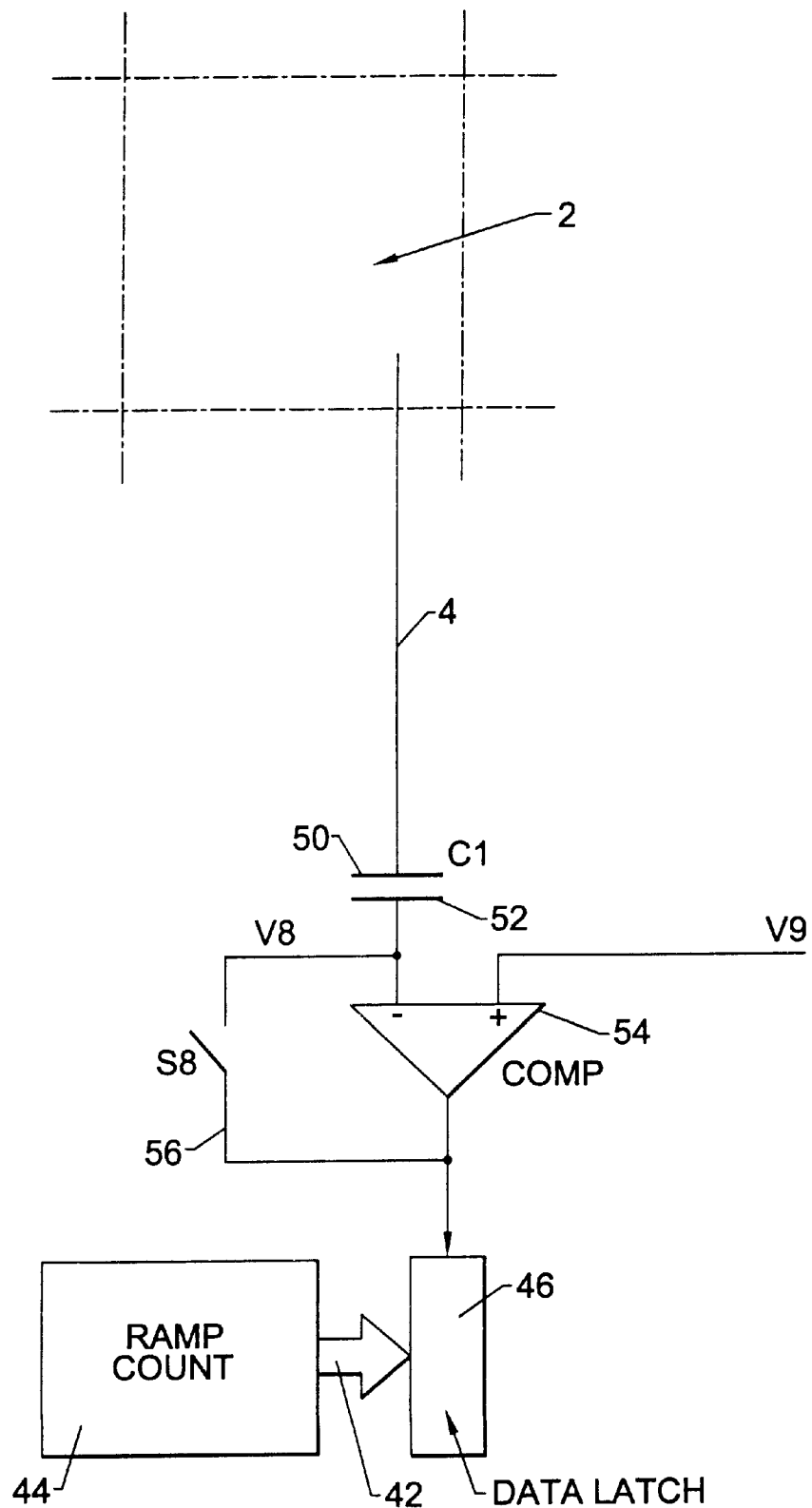
FIG. 5 shows schematically a portion of an active pixel image sensor according to a fourth embodiment of the invention.

A further embodiment of the invention is shown in FIG. 5 which also enables a digitised fixed-offset-corrected signal to be obtained. In this embodiment each pixel column 4 is provided with a capacitor C1 in series with the pixel 2, a first terminal 50 of C1 being connected to the pixels 2 in said column 4 and a second terminal 52 being connected to the negative input of a comparator 54 having one positive and one negative input as shown in FIG. 5. A negative feedback loop 56 is provided, containing a switch S8, so that when switch S8 is closed the second (lower) terminal 52 of C1 is biased at the switching point of the comparator 54.

In use, the pixel 2 is read first with the switch S8 closed and the pixel array is exposed to an incoming image while a constant reference voltage V9 is applied to the positive comparator input, thereby storing a signal (Vreset−Vsig−Voff) on C1. Switch S8 is subsequently opened and the pixel 2 is reset. C1 discharges by the amount of the signal to be detected i.e. Vsig. V9 is simultaneously replaced by a ramp voltage Vr commencing at value V9. A similar latch mechanism 46 and digital count generating and broadcasting means 42, are used to latch the digital count at the instant when the ramp voltage Vr=Vsig. The digital fixed-offset-corrected pixel output is read out to an image frame store as before.

The operation of the switches used in the various above described embodiments, and the reading and resetting of pixels rows may be controlled in a number of ways. For example, the sequential addressing means used to read and reset the pixels, and/or the switches and/or the output buses may be controlled by dedicated or suitably programmed hardware provided integrally in the image sensor 1, and/or externally of the sensor 1. Alternatively, or additionally, a microprocessor unit programmed with dedicated software could be used to control the components of the image sensor.

It will be appreciated that the present invention is also applicable for use with photogate type pixel arrays.

However, due to the inherently different natures of photodiode and photogate-type pixels the above described procedures for carrying out the fixed offset correction will be modified slightly for use with photogate pixel arrays. For example, in the embodiment of FIG. 2, instead of first storing on C1 the combined output signal from the pixel 2 and then opening switch S2 and resetting the pixel, the reverse procedure is applied i.e. the pixel is reset and the reset signal stored on C1, then switch S2 is opened and the combined output signal from the pixel flows to C1, so that the potential on mode 13 of C2 changes by:

$$V\text{sig.}(C1/(C1+C2)),$$

as before.

Similar modifications to the error-correction techniques applied using the circuits of FIGS. 3, 4 and 5 would allow these circuits to be applied with photogate-type pixel arrays.

We claim:

1. An integrated circuit active pixel image sensor comprising an array of active pixels arranged in rows and columns, and pixel read and reset means for reading and resetting said pixels row by row, wherein in each said pixel column there is provided: first capacitor means having a pair of terminals and being selectively connectable to each pixel in said column for storing a combined pixel output comprising an image signal and a fixed offset signal, from a nominated pixel in said column and a nominated one of said rows; second capacitor means having a pair of terminals and also being selectively connectable to each pixel in said column, for storing a further signal obtained when said second capacitor means is connected to said nominated pixel and said nominated pixel is reset; first voltage reference input means via which a constant reference voltage may be applied to one terminal of said first capacitor means while said combined pixel output signal is stored on said first capacitor means; second voltage reference input means via which a constant reference voltage may be applied to one terminal of said second capacitor means while said further signal is stored on said second capacitor means; and comparator means for comparing said signals stored on said first and second capacitor means; and wherein the sensor further includes: a ramp voltage source which is selectively connectable to at least one of the terminals of said first and second capacitor means of each said pixel column; a latch means in each said column connected to an output terminal of the comparator means in said column, for detecting a change in polarity in an output from said comparator means; and digital count broadcasting means adapted to broadcast to each of said columns of the pixel array, simultaneously with said ramp voltage source, a digital count signal corresponding to an analog voltage produced by said ramp voltage source, each said latch means being adapted to latch said digital count signal at a switching point of the respective said comparator output so as to obtain a digitized fixed-offset-corrected pixel output signal for said nominated pixel in the respective column.

2. An integrated circuit active pixel image sensor according to claim 1, wherein said first and second capacitor means are each selectively connectable to said pixel by a respective switch means provided therefor.

3. An integrated circuit active pixel image sensor according to claim 1, further comprising at least one constant reference voltage source selectively connectable to said first and second voltage reference input means of said pixel columns.

4. An integrated circuit active pixel image sensor according to claim 1 wherein said active pixels are of photodiode type.

5. A fixed offset cancellation method for an integrated circuit active pixel image sensor having an array of active pixels arranged in rows and columns, the method comprising sequentially, for each row of pixels in the array, carrying out the steps of:

(a) storing, in each said column of the array, a combined pixel output signal comprising an image signal and a fixed offset signal read from said respective pixel in said row;

(b) storing, in each said column, a further signal obtained when each said respective pixel in said row is reset:

(c) using comparator means and latch means provided in each said column, together with a ramp voltage source and digital count broadcasting means provided in the integrated circuit active pixel image sensor, to obtain a digitized fixed-offset-corrected pixel output signal for each said pixel in the row; and (d) scanning out said fixed-offset-corrected pixel output signals directly from the image sensor.

* * * * *

UNITED STATES PATENT AND TRADEMARK OFFICE
CERTIFICATE OF CORRECTION

PATENT NO. : 6,067,113
DATED : May 23, 2000
INVENTOR(S) : Hurwitz et al.

It is certified that error appears in the above-identified patent and that said Letters Patent is hereby corrected as shown below:

Title page, item [73], in the Assignee's name, "VSLI" should read --VLSI--.

Signed and Sealed this

First Day of May, 2001

Attest:

NICHOLAS P. GODICI

*Attesting Officer*   *Acting Director of the United States Patent and Trademark Office*